(12) United States Patent
Iwabuchi et al.

(10) Patent No.: US 9,550,397 B2
(45) Date of Patent: Jan. 24, 2017

(54) TIRE

(75) Inventors: Sotaro Iwabuchi, Kawasaki (JP); Takamitsu Nakamura, Higashiyamato (JP); Dyta Itoi, Tokyo (JP); Yasuo Himuro, Tachikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 945 days.

(21) Appl. No.: 13/821,773

(22) PCT Filed: Aug. 31, 2011

(86) PCT No.: PCT/JP2011/004892
§ 371 (c)(1),
(2), (4) Date: Jul. 25, 2013

(87) PCT Pub. No.: WO2012/032741
PCT Pub. Date: Mar. 15, 2012

(65) Prior Publication Data
US 2013/0299056 A1  Nov. 14, 2013

(30) Foreign Application Priority Data

Sep. 9, 2010  (JP) .................. 2010-202237
Sep. 16, 2010 (JP) .................. 2010-208085
Sep. 24, 2010 (JP) .................. 2010-213922

(51) Int. Cl.
*B60C 13/00* (2006.01)

(52) U.S. Cl.
CPC .................. *B60C 13/001* (2013.04)

(58) Field of Classification Search
CPC ...... B60C 13/00; B60C 13/001; B60C 13/002; B60C 13/02; B60C 13/04
See application file for complete search history.

(56) References Cited

U.S. PATENT DOCUMENTS 5,645,661 A  7/1997  Clementz et al.
6,253,815 B1  7/2001  Kemp et al.

FOREIGN PATENT DOCUMENTS

| DE | 39 24 459 A1 | 3/1990 |
|---|---|---|
| DE | 100 04 439 A1 | 8/2001 |
| EP | 0 249 918 A2 | 12/1987 |
| GB | 2018718 A | 10/1979 |
| JP | 10193923 A | 7/1998 |
| JP | 10222070 A | 8/1998 |
| JP | 2000-513290 A | 10/2000 |
| JP | 2000326708 A | 11/2000 |
| JP | 2002-120519 * | 4/2002 |
| JP | 2002-522294 A | 7/2002 |
| JP | 2003-175707 A | 6/2003 |
| JP | 2003-200715 A | 7/2003 |

(Continued)

OTHER PUBLICATIONS

Japanese Office Action, dated Jul. 1, 2014, issued in corresponding Japanese Patent Application No. 2010-208085.

(Continued)

*Primary Examiner* — Justin Fischer
(74) *Attorney, Agent, or Firm* — Sughrue Mion, PLLC (57) ABSTRACT

The present invention provides a tire capable of effectively enhancing the visibility of marks. The tire is provided with a mark 3 on a surface of a side portion 1, in which the mark 3 is formed so as to vary at least one of the hue, brightness and saturation.

14 Claims, 11 Drawing Sheets

(56) References Cited

FOREIGN PATENT DOCUMENTS

| JP | 2005-289143 A | | 10/2005 |
|----|---------------|---|---------|
| JP | 2006-224704 | * | 8/2006 |
| JP | 2007-79979 A | | 3/2007 |
| JP | 2008-62704 A | | 3/2008 |
| JP | 2008-201384 A | | 9/2008 |
| JP | 2008-254513 A | | 10/2008 |
| JP | 2008-290500 A | | 12/2008 |
| JP | 2009-96272 A | | 5/2009 |
| JP | 2009-143403 | * | 7/2009 |
| JP | 2010-125440 A | | 6/2010 |
| WO | 2005/044595 A1 | | 5/2005 |
| WO | 2009/154008 A1 | | 12/2009 |

OTHER PUBLICATIONS

Japanese Office Action, dated Jul. 1, 2014, issued in corresponding Japanese Patent Application No. 2010-202237.
Japanese Office Action, dated Jul. 1, 2014, issued in corresponding Japanese Patent Application No. 2010-213922.
Japanese Office Action, dated Jul. 29, 2014, issued in corresponding Japanese Patent Application No. 2010-213922.
Extended European Search Report, dated Apr. 17, 2014, issued in European Patent Application No. 11823222.2.
Communication dated Jan. 6, 2015 from the Japanese Patent Office in counterpart application No. 2010-202237.
Chinese Office Action, dated Dec. 1, 2014, issued in corresponding Chinese Patent Application No. 201180050307.7.
International Search Report for PCT/JP2011/004892 dated Dec. 13, 2011.

* cited by examiner

TIRE

CROSS REFERENCE TO RELATED APPLICATIONS

This application is a National Stage of International Application No. PCT/JP2011/004892 filed Aug. 31, 2011, claiming priority based on Japanese Patent Application Nos. 2010-202237 filed Sep. 9, 2010, 2010-208085 filed Sep. 16, 2010 and 2010-213922 filed Sep. 24, 2010, the contents of all of which are incorporated herein by reference in their entirety.

TECHNICAL FIELD

The present invention relates to a tire, which may be either of a pneumatic tire or a solid tire, provided with a mark on a surface of a side portion. In particular, the invention is intended to propose a technique that is capable of enhancing the identifiability of the tire.

RELATED ART

On the surface of the side portion which includes outer surfaces of a sidewall portion and a bead portion, information such as a company name, a brand name, a tire size, manufacturing date and the like have been displayed conventionally with a mark consisting of a pattern and/or a symbol including a letter, a graphic and a bar code. The mark on the surface of the side portion of the tire is commonly formed of an uneven surface such as a projection, a recess or a ridge (see Patent Document 1, for example.).

Patent Document 1: Japanese Patent Application Laid-Open Publication No. 2008-201384

SUMMARY OF THE INVENTION

However, the mark formed of an uneven surface on the surface of the side portion of the tire does not have a significant color difference from its background and thus has a problem with low idenfiability.

The present invention is intended to solve the problem that the conventional techniques face and its object is to provide a tire that is capable to effectively enhance the identifiability of the mark.

In order to solve the above-mentioned problems, the tire of the present invention has a mark placed on a surface of a side portion of the tire, wherein the mark is formed so as to vary in at least one of hue, brightness and saturation thereof.

The "mark" as used herein consists of a letter, a symbol, a design, a graphic shape, a pattern, or any combination thereof.

The mark on such a tire may be formed of colored rubber including white rubber and black rubber or printing, or by applying paint or a sticker. In particular, for manufacturing and aesthetic reasons, it is preferable that the mark is formed with a coloring process through printing. In order to enhance the identifiability of the mark, it is preferable that the mark has a color (including white and black) different from the base color (i.e. the color of the color constituting the side portion of the tire) in the region where the mark is formed.

In addition, according to the tire of the present invention, it is preferable that the mark includes a gradation portion in which at least one of the hue, brightness and saturation thereof varies stepwise.

In addition, according to the tire of the present invention, it is preferable that the mark includes a letter portion and the gradation portion is arranged adjacent to and along a contour of the letter portion.

In addition, according to the tire of the present invention, it is preferable that the mark consists of a letter portion and that the letter portion is formed so as to vary in at least one of hue, brightness and saturation thereof stepwise.

In addition, according to the tire of the present invention, it is preferable that the mark consists of a stripe portion extending along a circumferential direction of the tire in a stripe shape and composed of two or more regions having different colors.

In addition, according to the tire of the present invention, it is preferable that the tire has the mark consisting of a letter portion in addition to the mark consisting of the stripe portion, and that the mark consisting of the letter portion is arranged to overlap the mark consisting of the stripe portion and is colored.

In addition, according to the tire of the present invention, it is preferable that a line is provided to hem the mark, and that the line consists both of a bright line part having a brighter color than the color of the mark and disposed radially and circumferentially on one side of the mark, and a dark line part having a darker color than the color of the mark and disposed radially and circumferentially on the other side of the mark.

In addition, according to the tire of the present invention, it is preferable that the mark and the line are arranged on a flat part of the side portion of the tire.

In addition, according to the tire of the present invention, it is preferable that the tire is provided with a convex part projecting from the outer surface of the side portion to allow a top face thereof to form the mark; radially and circumferentially one side of the convex part forms the bright line part; and radially and circumferentially the other side of the convex part forms the dark line part.

In addition, according to the tire of the present invention, it is preferable that the mark formed with a smooth surface is provided on a surface radially outward from a tire maximum width position, and that another mark formed with an uneven surface is provided on a surface radially inward from the tire maximum width position.

The term "tire maximum width" as used herein refers, for a solid tire, to the maximum straight line width between the surfaces of the side portions excluding any convex such as a pattern or a letter on the side portions of the tire; and, for a pneumatic tire, to the maximum straight line width between the sidewalls excluding any convex such as a pattern or a letter on the side portion of the tire under the condition that the tire is mounted to an applicable rim, filled with a predetermined air pressure with no-load applied on the tire. The term "applicable rim" as used herein refers to a rim predetermined by specifications listed below in accordance with the size of the tire. The term "predetermined air pressure" as used herein refers to a predetermined air pressure corresponding to the maximum loading capacity under specifications listed below. The term "the maximum loading capacity" as used herein refers to the maximum permissible weight to be loaded on the tire under specifications listed below. In addition, the term "air" as used herein may be substituted by an inert gas such as nitrogen gas.

The term "specification" as used herein refers to valid industrial specifications in the regions where the tire is produced and used. For example, in the U.S., it refers to "The Tire and Rim Association Inc. YEAR BOOK"; in Europe, it refers to "The European Tyre and Rim Technical Organisation STANDARD MANUAL"; and in Japan, it refers to JATMA (The Japan Automobile Tyre Manufacturers Association) YEAR BOOK.

According to the present invention, the identifiability of the mark can be enhanced by providing a desired color including white and black on the mark.

In particular, when the mark includes a gradation portion in which at least one of the hue, brightness and saturation thereof varies stepwise, it is possible to improve a design as well as to enhance its identifiability.

Furthermore, when the gradation portion is arranged along a contour of the letter portion that constitutes part of the mark, it is possible to enhance the identifiability of the marks as well as to obscure any uneven printing, rubbing and the like at the boundary between the letter portion and the base of the region where the mark is provided, thereby maintaining a good appearance.

In addition, when the mark consists of a stripe portion extending along a circumferential direction of the tire in a stripe shape and composed of two or more regions having different colors, corporate identity including a product name, a brand name or a company name, or visual identity can be expressed by, for example, a combination of the colors of the stripe portion. In addition, when the mark consisting of the letter portion is arranged to overlap the mark consisting of the stripe portion and is colored, the letter portion can further enhance the identifiability in conjunction with the letter information of the letter portion.

In addition, when the mark and a line hemming the mark are provided on the outer surface of the side portion of the tire, and the line consists both of a bright line part disposed radially and circumferentially at one side of the mark, and a dark line part disposed radially and circumferentially at the other side of the mark, the mark can appear to be stereoscopic even though the mark is arranged on a flat part of the surface. As a result, the mark appears to be raised from the side portion of the tire so as to greatly improve the identifiability and provide a decorative effect different from an appearance of a conventional tire. Furthermore, even if the surface of the line is slightly dirty or damaged, the stereoscopic appearance of the tire remains the same as long as the relative color difference between the mark and the line does not change. Thus, the identifiability of the tire can be maintained over a long term use.

Furthermore, when the mark and the line are arranged on a flat surface of the side portion of the tire, the mark and line do not project from the outer surface of the tire, which reduces the risk of rubbing the mark and line with a curb during driving. This allows the identifiability of the mark to be maintained even longer.

When the tire is provided with a convex part projecting from the outer surface of the side portion to allow a top face thereof to form the mark, radially and circumferentially on one side of the convex part forms the bright line part; and radially and circumferentially on the other side of the convex part forms the dark line part, the stereoscopic appearance of the mark becomes more obvious to further improve the identifiability of the mark and provide a decorative effect further different from an appearance of a conventional tire.

In addition, when the mark formed with a smooth surface is placed on a surface of a radially outward region from the tire maximum width position where the risk of rubbing with a curb or the like is highest, which has a higher circumferential velocity during the rotation of the tire, the likelihood of an increase of air resistance due to the mark can be effectively eliminated. In addition, the identifiability can be sufficiently increased by providing a desired color including white and black on the mark formed with a smooth surface depending on the selected size of the mark.

However, when another mark formed with an uneven surface such as an engraving is provided on a surface of a radially inward region from the tire maximum width position, which has a lower circumferential velocity during the rotation of the tire, the unintended disappearance of the another mark such as codes defined in the standards can be effectively prevented. It should be noted that the another mark has a relatively small effect on the air resistance because the radius of rotation and the circumferential velocity during the rotation of the tire are smaller in this region.

BRIEF DESCRIPTION OF DRAWINGS

FIG. 1 (a) is a side view of the tire according to a first embodiment of the present invention.

FIG. 1 (b) is a cross-sectional view taken along the line A-A in FIG. 1 (a).

DESCRIPTION OF EMBODIMENTS

Embodiments of the present invention are described below with reference to the drawings. The reference numeral 1 denotes a side portion including a side wall portion and a bead portion of a pneumatic tire. The pneumatic tire of this embodiment has a plurality of marks for indicating a company name, a tire size and the like on the outer surface of the side portion 1 of the tire.

Figure 1:
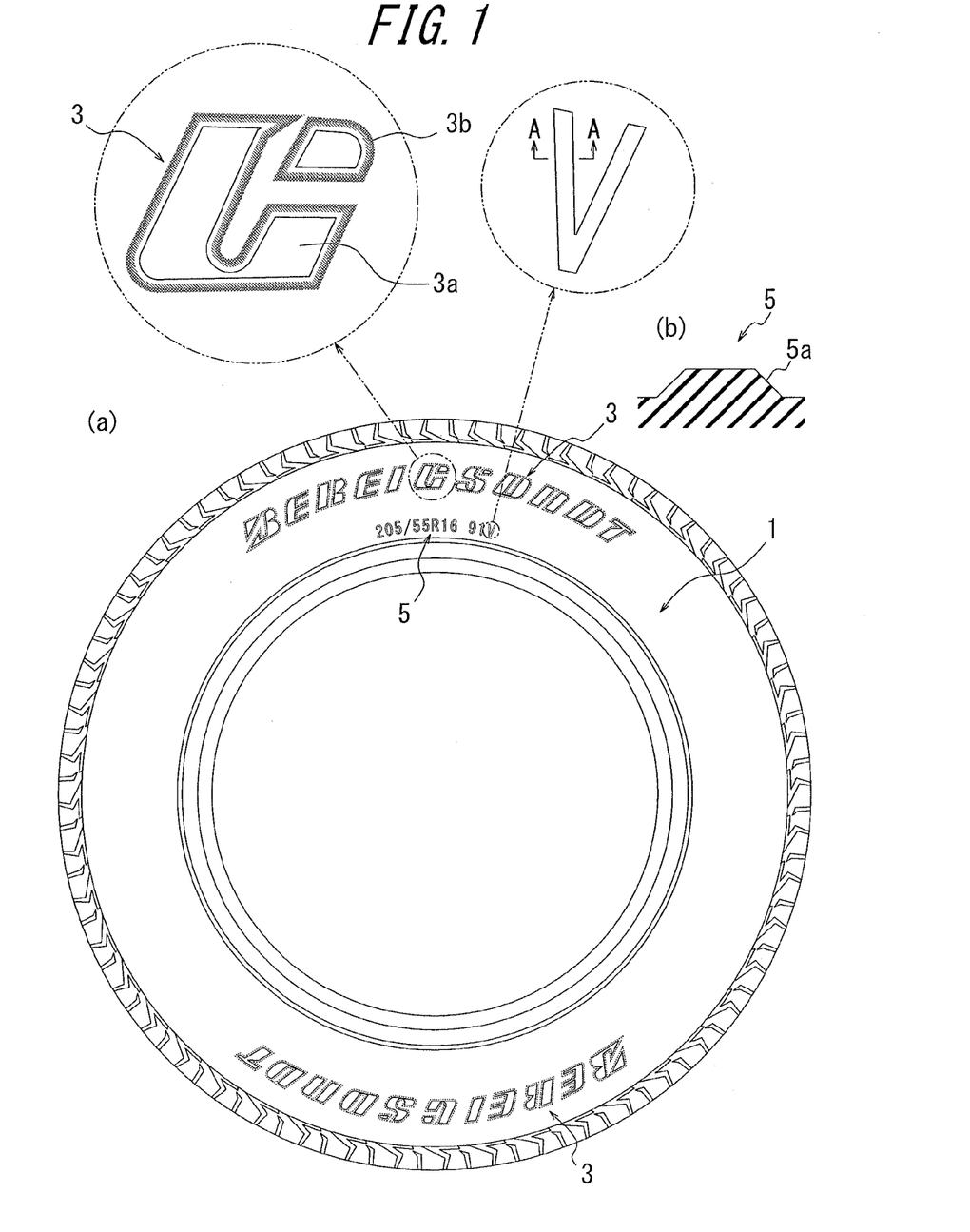

In the embodiment illustrated in FIG. 1, a mark 3 formed with a smooth surface and displaying the company name and the like is provided by printing on an outer surface of a region radially outward from the tire maximum width position, and another mark 5 formed with an uneven surface and indicating, for example, a tire size or the like, is provided on an outer surface of a region radially inward from the tire maximum width position. The mark 5 formed with an uneven surface preferably has an inclined wall 5a obliquely standing from the surface of the tire. This allows the inclined wall 5a to be colored by printing or the like to improve the identifiability. Furthermore, in addition to the improvement of the identifiability, printing the mark 3 and the like makes the portion where the mark is formed on the surface of the tire flat, so that the fuel efficiency can be higher due to less air resistance during driving, and the durability of the tire can be better due to less likelihood of a side crack.

The mark 3 is formed so as to vary in at least one of hue, brightness and saturation thereof. More particularly, the mark 3 consists of a letter portion 3a indicating the company name and the like and a gradation portion 3b which is arranged adjacent to and along a contour of the letter portion 3a with at least one of hue, brightness and saturation thereof varying stepwise.

In this example, the letter portion 3a is colored in dark blue, and the basic color of the gradation portion 3b is white. The gradation portion 3b is printed or colored so that the amount of ink applied to the gradation portion 3b is gradually reduced from the contour of the letter portion 3a to the outer side, and thus the brightness is dimmed continuously and stepwise to allow the color of the gradation portion to change into the base color (black rubber color) of the tire. In this way, a blur can be administered around the letter portion 3a to sufficiently increase the identifiability of the smooth surface mark 3 in conjunction with a letter, a graphic, a symbol, a pattern and the like which are constitutional elements of the mark. In addition, it is possible to obscure uneven printing, rubbing and the like at the boundary between the letter portion 3a and the base in the region where the mark is arranged on the surface of the side portion of the tire, thereby maintaining a good appearance.

The difference of the brightness in the gradation portion is preferred to be 30% or more. This allows a user to certainly recognize the gradation, which results in the better identifiability of the mark 3. It is noted that the term "difference of the brightness" as used herein means the difference between the highest brightness and lowest brightness in the gradation portion.

In addition, a difference of the saturation in the gradation portion is preferred to be 30% or more. This allows a user to certainly recognize the gradation, which results in the better identifiability of the mark 3. It is noted that the term "difference of the saturation" as used herein means the difference between the highest saturation and lowest saturation in the gradation portion.

In addition, a difference of the hue in the gradation portion is preferred to be 45 degrees or more. This allows a user to certainly recognize the gradation, which results in the better identifiability of the mark 3. It is noted that the term "difference of the hue" as used herein means the difference between the highest hue and lowest hue in the gradation portion.

In addition, the brightness in the gradation portion is preferably decreased from the inside toward the outside. As a result, a blur effect can be enhanced around the letter portion 3a. Similarly, the saturation in the gradation portion is preferably decreased from the inside toward the outside.

It is noted that the brightness, saturation and hue are defined by the HSV model, and are managed in the following two ways. The first method is to prepare or create a color sample to identify them. In other words, a personal computer and a printer are used to print a large number of color samples on papers, and the color samples are placed on the mark 3 to implement a simple identification. The second method is to measure the brightness, saturation and hue of the mark 3 on a different color system (e.g. the Lab color space) by means of a spectrophotometer (e.g., manufactured by Konica Minolta) and subsequently convert the result to HSV system with necessary software (e.g., Photoshop™).

Figure 2:
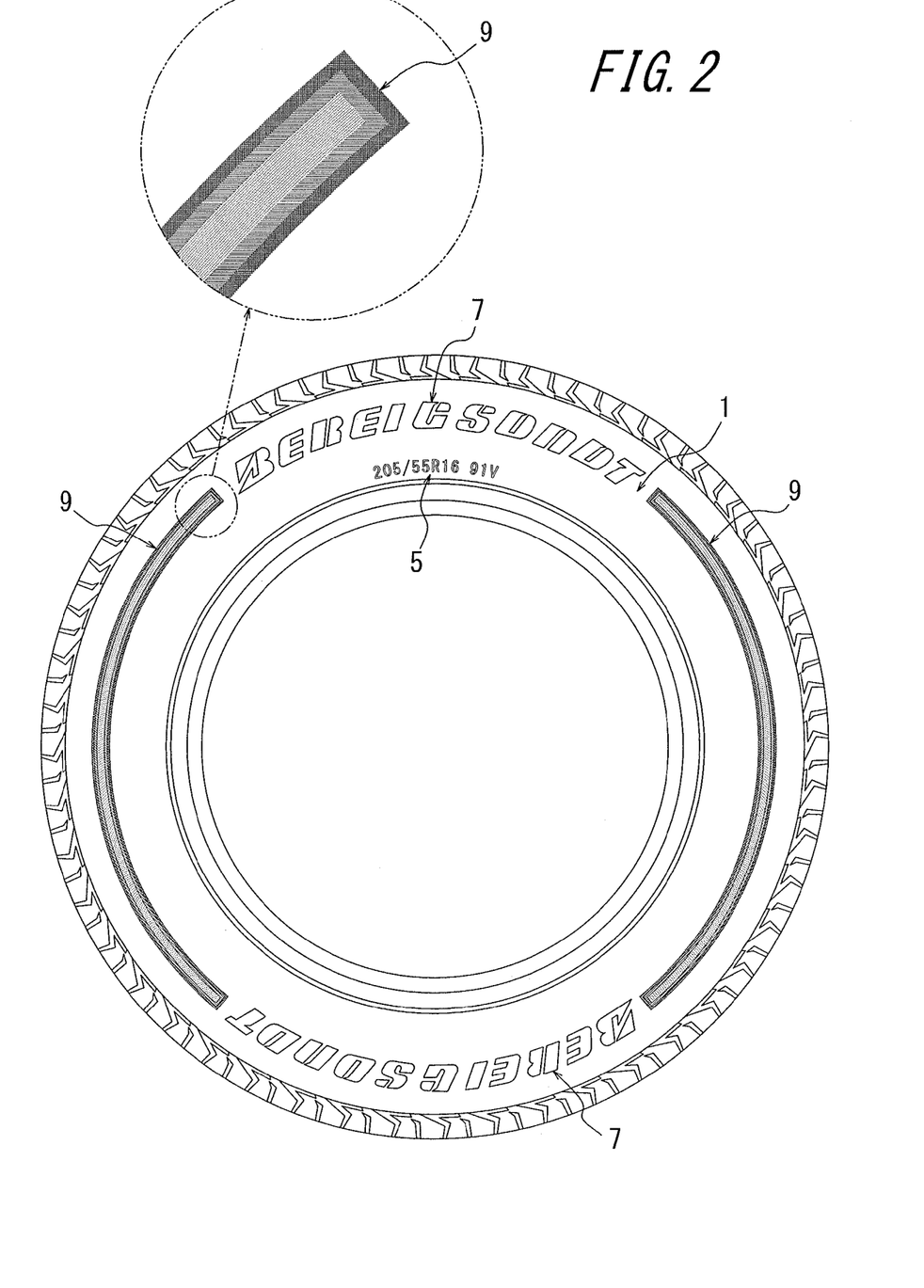
FIG. 2 is a side view of the tire according to a second embodiment of the present invention.

FIG. 2 illustrates another embodiment of the tire in which a mark 9 formed of a gradation portion is provided separately from a mark 7 formed of a white letter portion. The basic color of the mark 9 is light blue and is colored so as to reduce the brightness radially outward in a continuous and stepwise manner.

Figure 3:
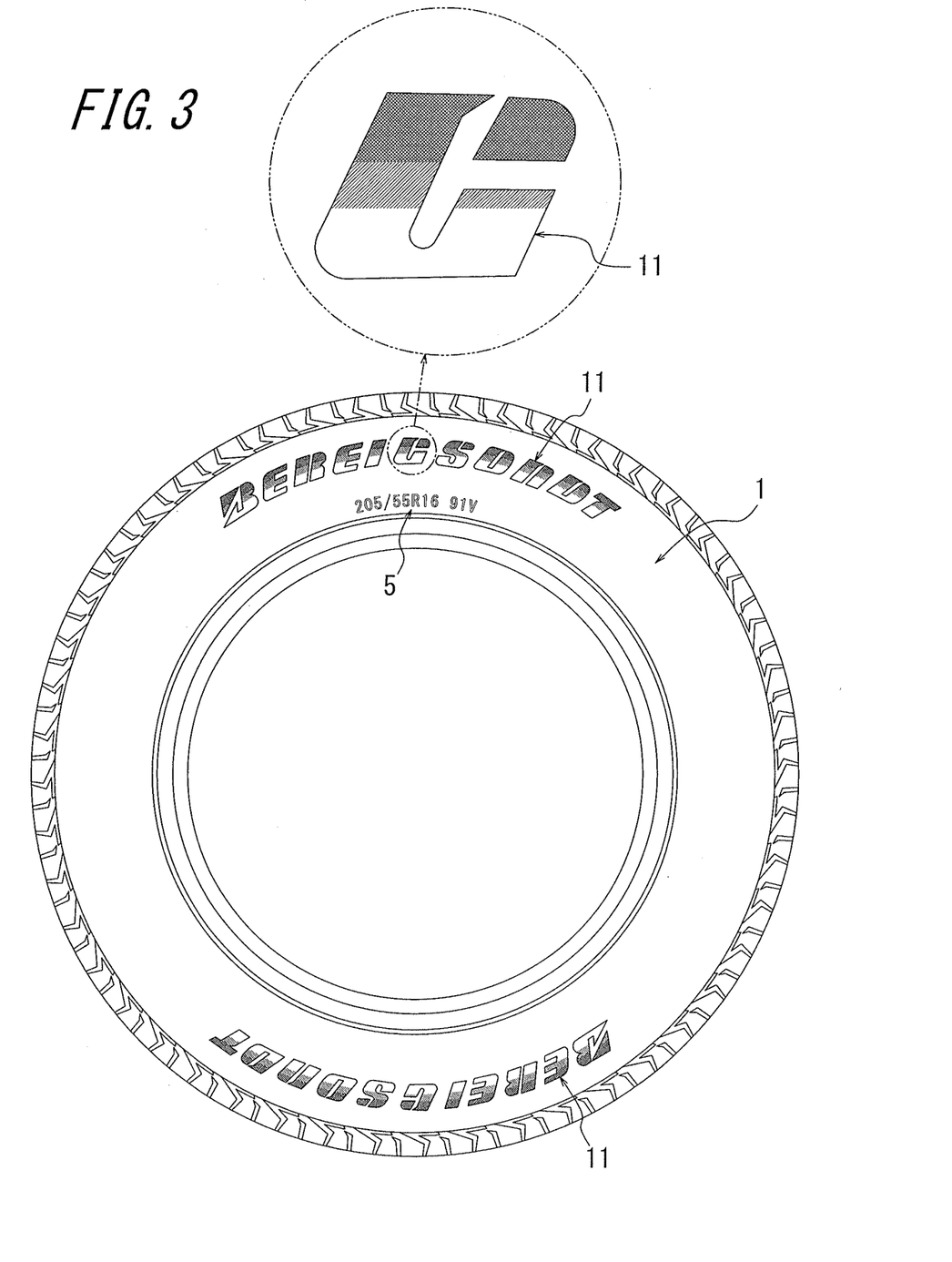
FIG. 3 is a side view of the tire according to a third embodiment of the present invention.

FIG. 3 illustrates another embodiment of the tire in which a mark 11 consists of a letter portion, and the letter portion per se has the above-mentioned gradation effect. In other words, the letter portion is formed so as to vary in at least one of the hue, brightness and saturation thereof stepwise. In this example, the hue at the radially outermost is dark blue, and the gradation is arranged so that the brightness increases radially inward. In this manner, the color is prioritized on the surface that is subjected to more light while the brightness is prioritized on the surface that is subjected to less light, so that the identifiability of the mark can be improved.

Figure 4:
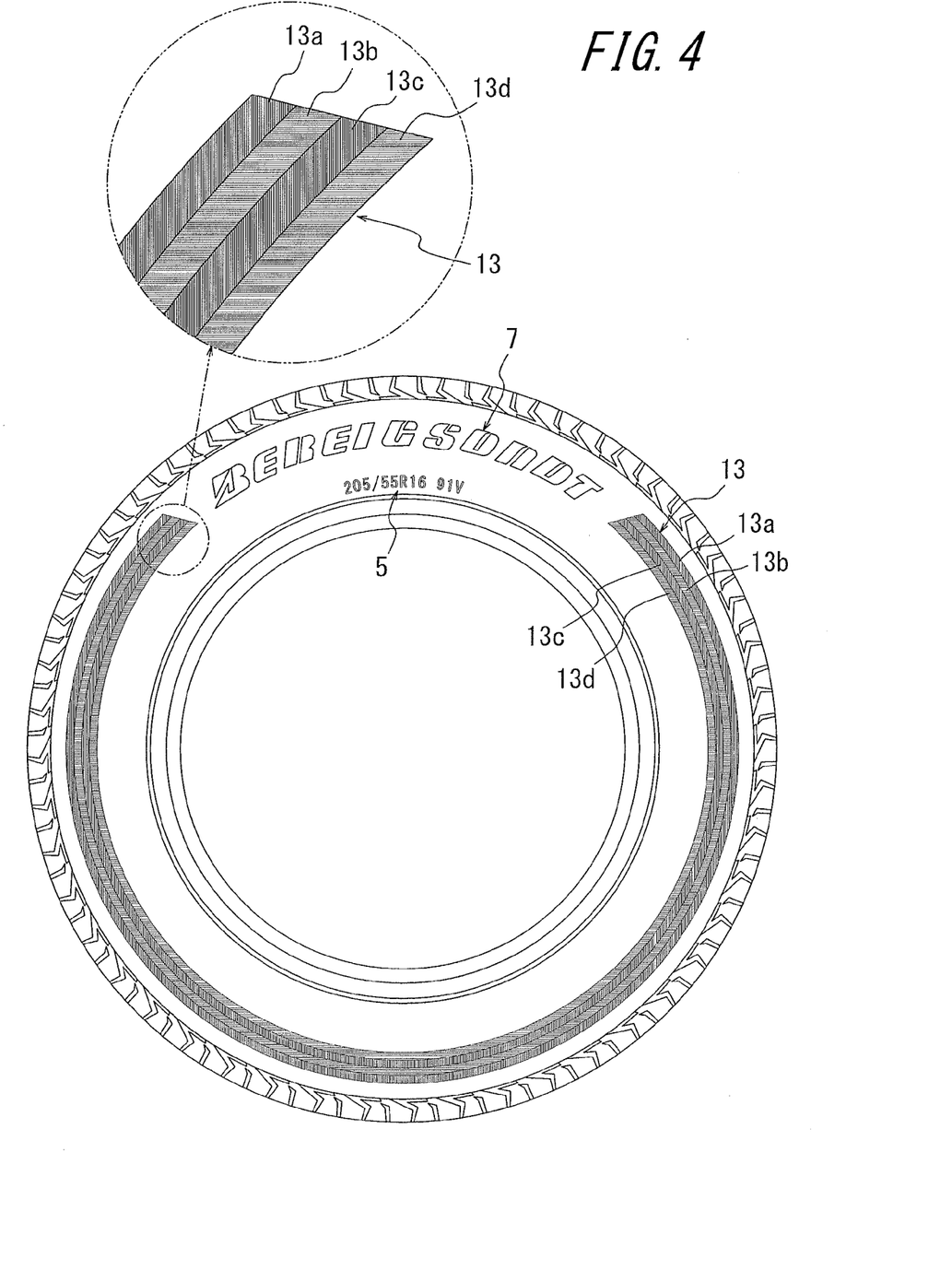
FIG. 4 is a side view of the tire according to a fourth embodiment of the present invention.

In the embodiment tire shown in FIG. 4, a mark 13 consists of a stripe portion 13 extending along a circumferential direction of the tire in a stripe shape and composed of two or more regions 13a-13d having different colors. In this example, the first region 13a is black, the second region 13b is red, the third region 13c is white, and the fourth region 13d is black. In this way, the stripe portion 13 is composed of a combination of colors, so that the corporate identity indicating a product, a brand or a company name, or a visual identity can be expressed. It should be noted that, in this figure, the mark 7 is colored solely in white.

Figure 5:
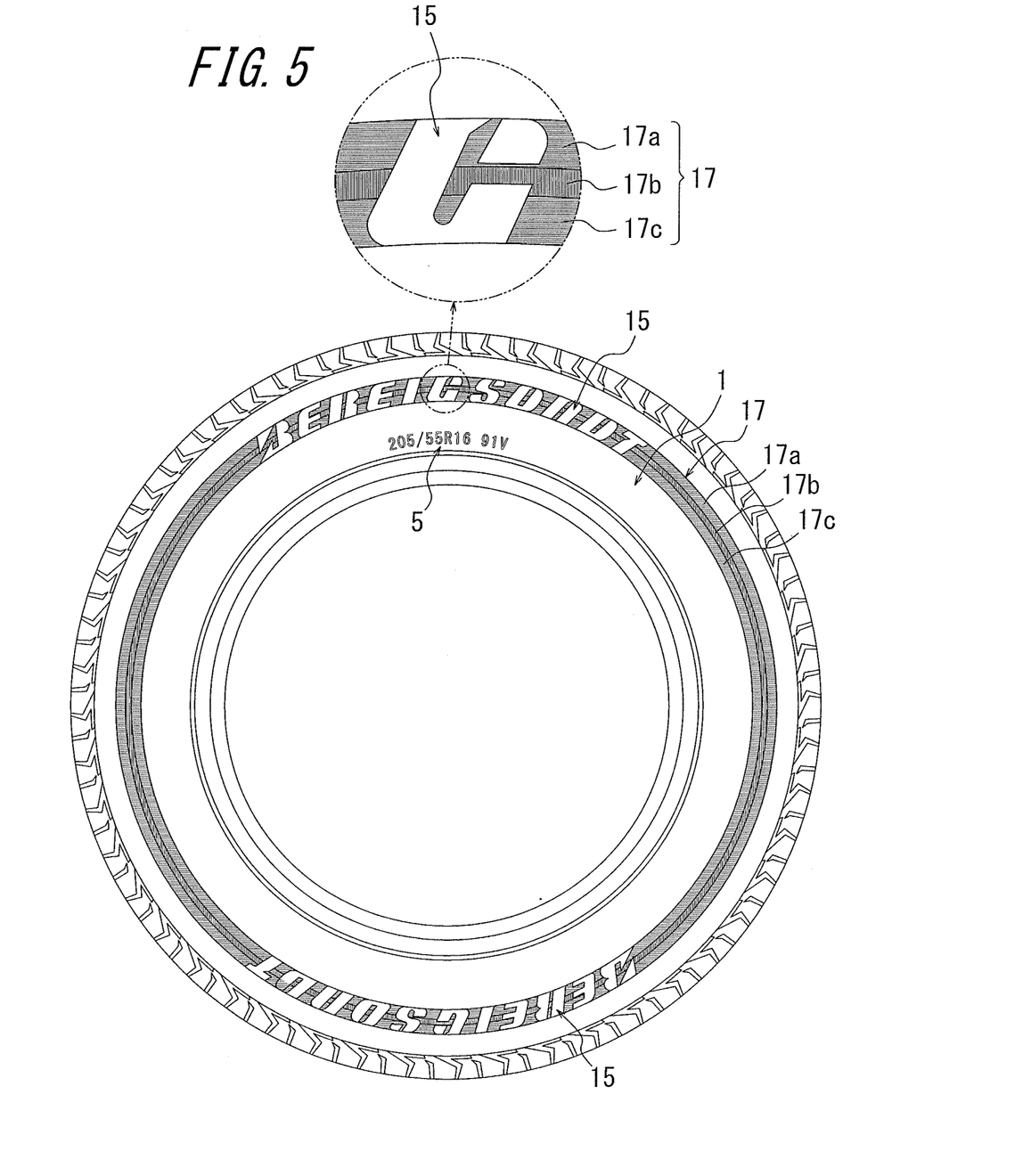
FIG. 5 is a side view of the tire according to a fifth embodiment of the present invention.

In the embodiment tire shown in FIG. 5, a mark 15 consisting of a letter portion is arranged on a mark 17 consisting of a stripe portion and is colored. In this example, the color of the letter portion constituting the mark 15 is white, a first region 17a of the mark 17 is dark blue, a second region 17b is light blue, and a third region 17c is dark blue. In this way, when the mark 15 consisting of the letter portion is arranged on the mark 17 consisting of the stripe portion and is colored, the identifiability can be further improved in conjunction with the textual information of the letter portion.

Example 1

Various example tires having the side portion as shown in FIG. 1 were prepared to have different brightness, saturation, and hue of the gradation portion. The mark of each tire was visually inspected to evaluate the identifiability of the mark. The results are shown in Table 2. The results are indicated by indices with the example tire 1 being as a standard. The greater the index is, the better the identifiability is.

Example tires 1-10 were prepared according to the conditions of the gradation portion of the mark shown in Table 1, the evaluation results are shown in Table 2.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Difference of brightness (%) | 30 | 40 | 20 | 0 | 0 | 0 | 0 | 0 | 0 | 30 |
| Difference of saturation (%) | 0 | 0 | 0 | 30 | 40 | 20 | 0 | 0 | 0 | 30 |
| Difference of hue (degree) | 0 | 0 | 0 | 0 | 0 | 0 | 45 | 60 | 30 | 45 |

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Identifiability the mark | 100 | 120 | 80 | 80 | 90 | 70 | 80 | 90 | 70 | 110 |

Next, other embodiments according to the present invention are described more specifically with reference to the drawings.

Figure 6:
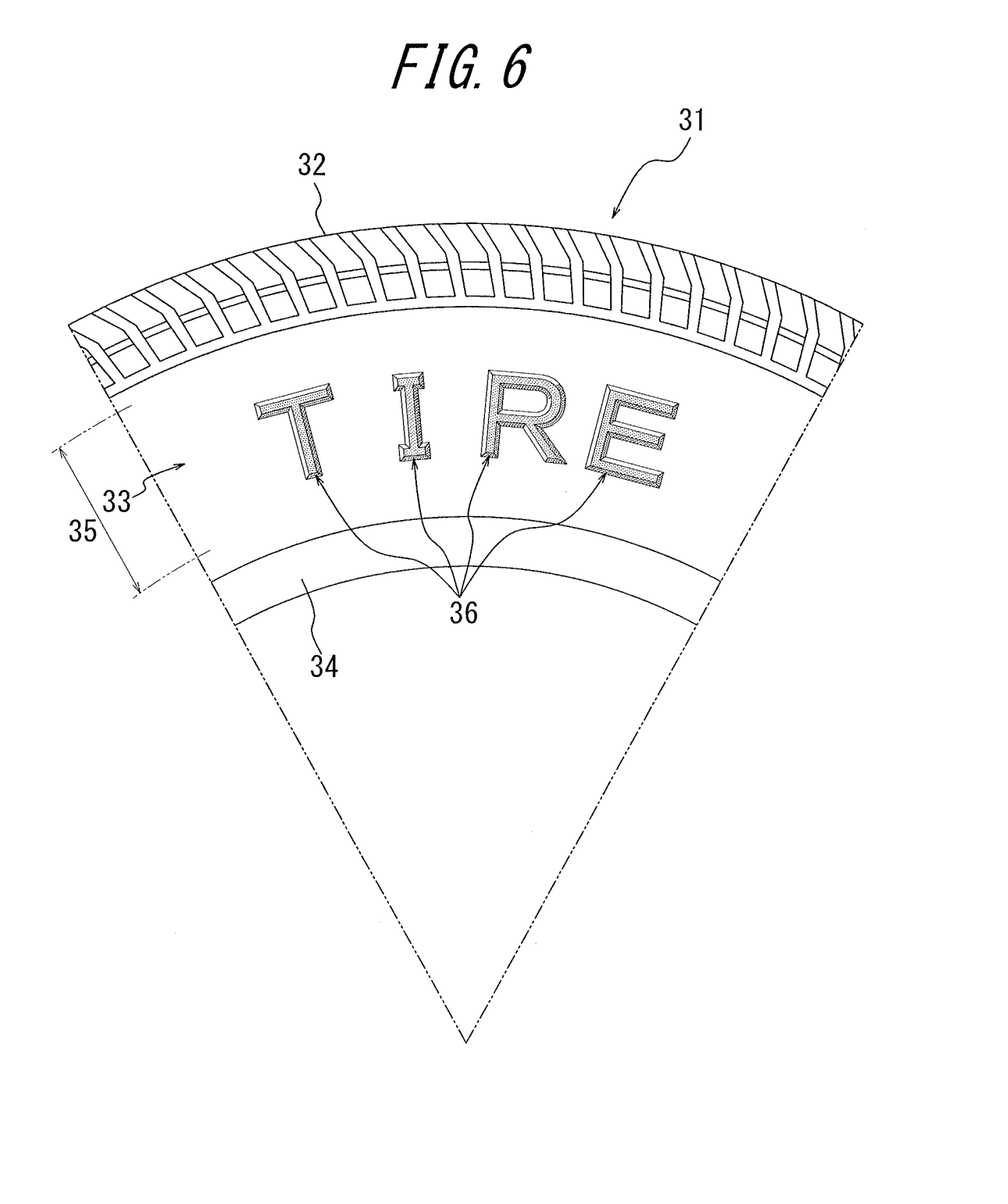
FIG. 6 is a partial side view of the tire according to a sixth embodiment of the present invention.
Figure 7:
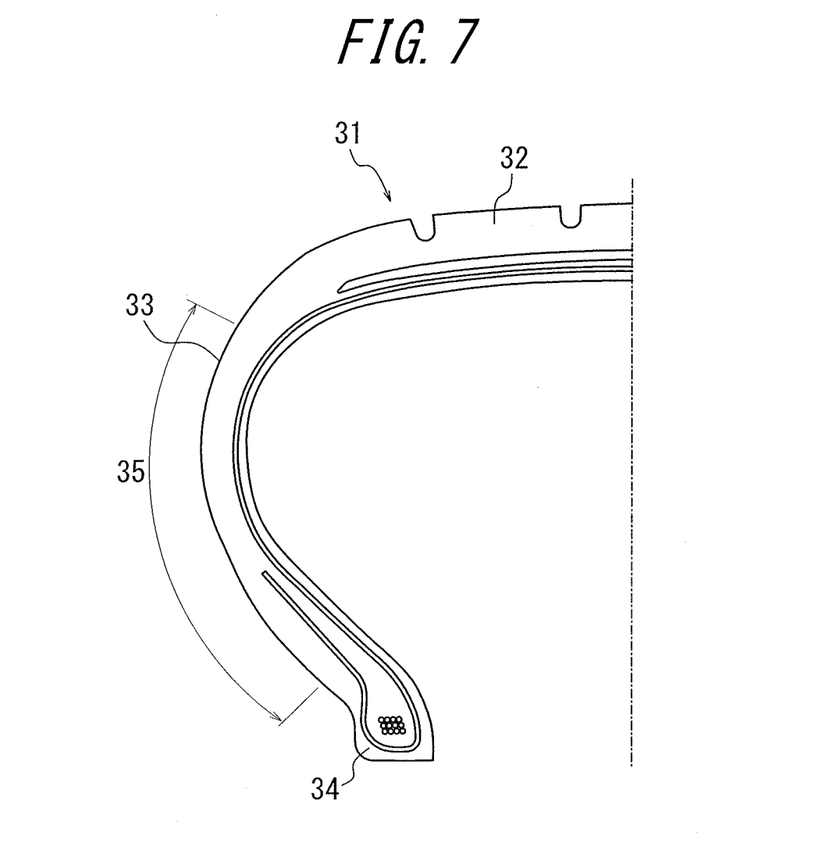
FIG. 7 is a partial cross-sectional view in the meridian direction of the tire shown in FIG. 6.

In FIGS. 6 and 7, the reference numeral 31 denotes a tire. The tire 31 includes a tread portion 32, a pair of sidewall portions 33 extending radially inward and continuously from each side of the tread portion 32, bead portions 34 each extending continuously and radially inward from the respective sidewall portion 33, and a mark 36 formed with a predetermined letter, a symbol or a graphic at the outer surface of a side portion 35 of the tire. The term "the side portion 35 of the tire" as used herein refers to an area from the sidewall portion 33 to a rim-fitting-portion of the bead portion 34. It should be noted that, although the tire 31 is illustrated as a pneumatic tire in this example, the present invention is not limited to a pneumatic tire, but can also be applied, for example, to a solid tire.

Figure 8:
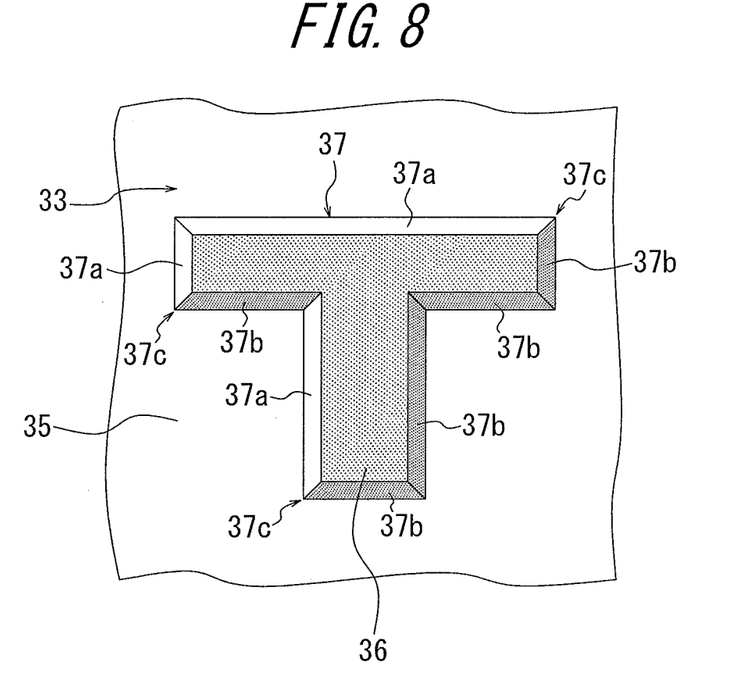
FIG. 8 is an enlarged view of a main portion in FIG. 6 illustrating a region where the mark is arranged.
Figure 9:
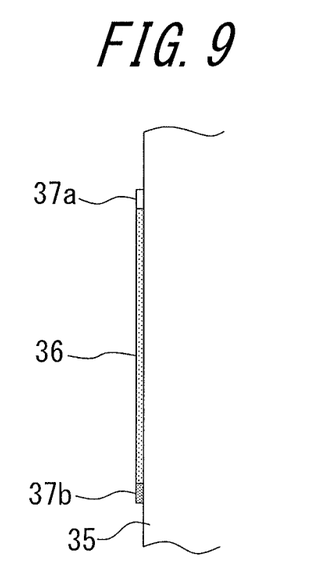
FIG. 9 is a partial cross-sectional view of the mark shown in FIG. 8 in the meridian direction at the center of the tire.

As illustrated in FIGS. 8 and 9, the mark 36 (in FIG. 8, only the letter "T" of the mark 36 shown in FIG. 6 is used by way of example) is hemmed with a line 37. The line 37 has a bright line part 37a disposed radially and circumferentially at one side of the mark 36 (in this particular example, at a radially outside and a circumferentially left side when facing to the mark 36) and adjacent to the boundary part of the mark 36, and a dark line part 37b disposed radially and circumferentially at the other side of the mark 36 (in this particular example, at a radially inside and a circumferentially right side when facing to the mark 36) and adjacent to the boundary part of the mark 36. The brighter color than the color of the mark 36 means that the color has a higher brightness than that of the color of the mark 36. The darker color than the color of the mark 36 means that the color has a lower brightness than that of the color of the mark 36. This produces an effect that, as if the 36 mark is exposed to light from the upper left side, the bright line part 37a appears to be shining while the dark line part 37b appears to be shaded. As a result, even when the mark 36 is arranged on a flat portion, the side portion 35 of the tire appears to be raised up to greatly improve the identifiability and provide the decorative effect different from that of a conventional tire. Furthermore, even when the surface of the line 37 is slightly dirty or damaged, the stereoscopic appearance of the tire remains the same as long as the relative color difference between the mark 36 and the bright and dark line parts 37a, 37b does not change. Thus, the identifiability of the tire 31 can be maintained over a long term use.

Here, when the boundary part 37c connecting the dark line part 37b and the bright line part 37a is angled, it is preferable that the bright line part 37a and the dark line part 37b are terminated and connected with each other in a inclined manner. When the boundary part 37c is curved (e.g. the curved part of the letter "R" of the mark shown in FIG. 6), it is preferable that the colors of the bright line part 37a and the dark line part 3 gradually changes from one to the other at the connected ends.

In addition, the mark 36, the bright line color part 37a and the dark line part 37b may be formed by printing or painting directly on the side portion 35 of the tire, or by applying a sticker. Alternatively, color rubber and cover rubber may be embedded into a green tire before vulcanization, and then the cover rubber may be scrapped off by a grinder after vulcanization to expose the color rubber. In addition, any one of the mark 36, bright color line 37a, and dark line part 37b may also be the ground color of the tire 31 without subjecting to the above-mentioned printing or the like.

In addition, when the bright line part 37a has the same width as the dark line part 37b, the mark 36 appears to be evenly raised up from the tire side portion 36 to enhance the decorative effect of the mark 36. In addition, when the bright line part 37a and the dark line part 37b each has a line width equal to or smaller than the line width of the mark 36, the line 37 is not prominent with respect to the mark 36, which does not hinder the identifiability of the mark 36.

Figure 10:
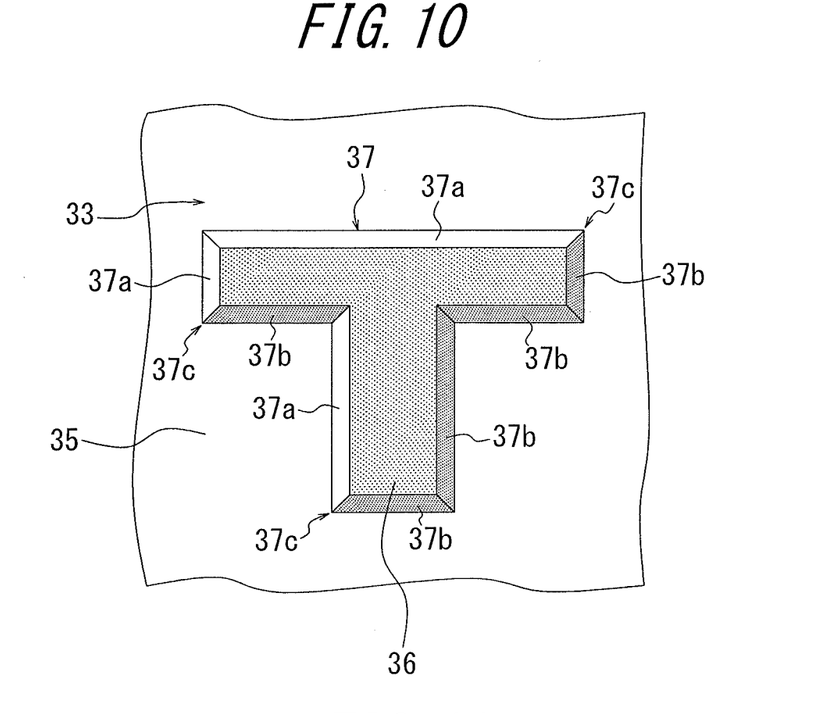
FIG. 10 is an enlarged view of a main portion illustrating the region where the mark is arranged according to a seventh embodiment of the present invention.
Figure 11:
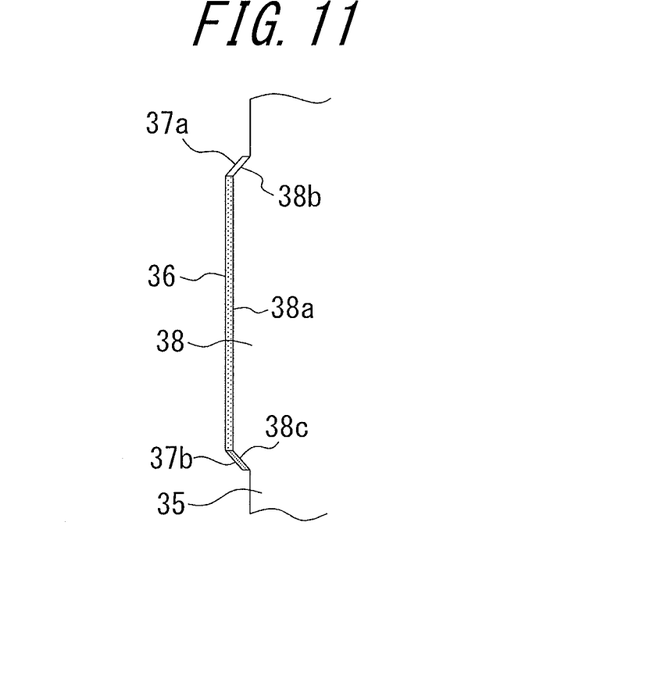
FIG. 11 is a partial cross-sectional view of the mark at the center in the meridian direction of the tire shown in FIG. 10.

As illustrated in FIGS. 10 and 11, when a convex part 38 having a top face 38a corresponding to the shape of the mark 36 is provided on the outer surface of the side portion 35 to be projected therefrom; the bright line part 37a is disposed on a side face 38b at radially and circumferentially one side (in this particular example, at a radially outside and a circumferentially left side when facing to the mark 36) among the side feces of the convex part 38; and the dark line part 37b is disposed on another side face 38c radially and circumferentially at the other side (in this particular example, at a radially inside and a circumferentially right side when facing to the mark 36) among the side faces of the convex part 38, the stereoscopic appearance of the mark 36 is enhanced to further improve the identifiability of the mark 36 and provide better decorative effect different from a conventional tire. In particular, when the side faces 38b and 38c are inclined toward the outer surface of the side portion 35 of the tire as illustrated in the figure, the stereoscopic appearance of the mark 36 has a larger viewing angle, which is more preferable.

Example 2

Two experimental tires 1 and 2 according to the present invention, a reference tire as a conventional example and a comparison tire were experimentally manufactured. The mark of each tire was visually inspected to evaluate the identifiability of the mark. The results are shown in table 3. The results are indicated by indices with the reference tire as a conventional example being set as a standard. The greater the index is, the better the identifiability is.

The experimental tire 1 had a tire size of 195/65R15, and was provided with a mark on a flat portion of the side portion of the tire The mark was colored in 20% gray (C0/M0/Y0/K20) and printed to have the height of 20 mm and the line width of 3 to 4 mm. A bright line part colored in white (C0/M0/Y0/K0) and having the line width of 1 mm was printed radially outward and adjacent to the circumferentially left side of the mark when facing the mark. A dark line part colored in dark blue (C100/M100/Y0/K60) and having the line width of 1 mm was printed radially inward and adjacent to the circumferentially right side of the mark when facing the mark.

The experimental tire 2 was equivalent to the experimental tire 1 except that it was provided with a convex part having a top face corresponding to the mark of the experimental tire 1 to be projected 0.5 mm in widthwise outward from the outer surface of the side portion of the tire. Bright line parts similar to that of the experimental tire 1 were printed on the radially outward side face and the circumferentially left side face of the convex part, and dark line parts similar to that of the experimental tire 1 were printed on the radially inward side face and the circumferentially right side face of the convex portion.

The reference tire was equivalent to the experimental tire 1 except that a mark was printed without providing a bright line part and a dark line part. The comparison tire was equivalent to the experimental tire 2 except that a convex part similar to that of the experimental tire 2 was provided without printing a mark, a bright line part and a dark line part.

TABLE 3

| | Reference Tire | Experimental Tire1 | Experimental Tire2 | Comparison Tire |
|---|---|---|---|---|
| Identifiability of the marks | 100 | 120 | 130 | 80 |

As a result, it was shown that the tires (the experimental tires 1 and 2) in which the marks were hemmed with the bright line part and the dark line part can ensure the identifiability better than that of the conventional tire. In particular, it was revealed that the tire (the experimental tire 2) in which the mark was printed on the top face of the convex part and the bright line part and the dark line part were printed on the side faces of the convex part has especially excellent identifiability.

Figure 12:
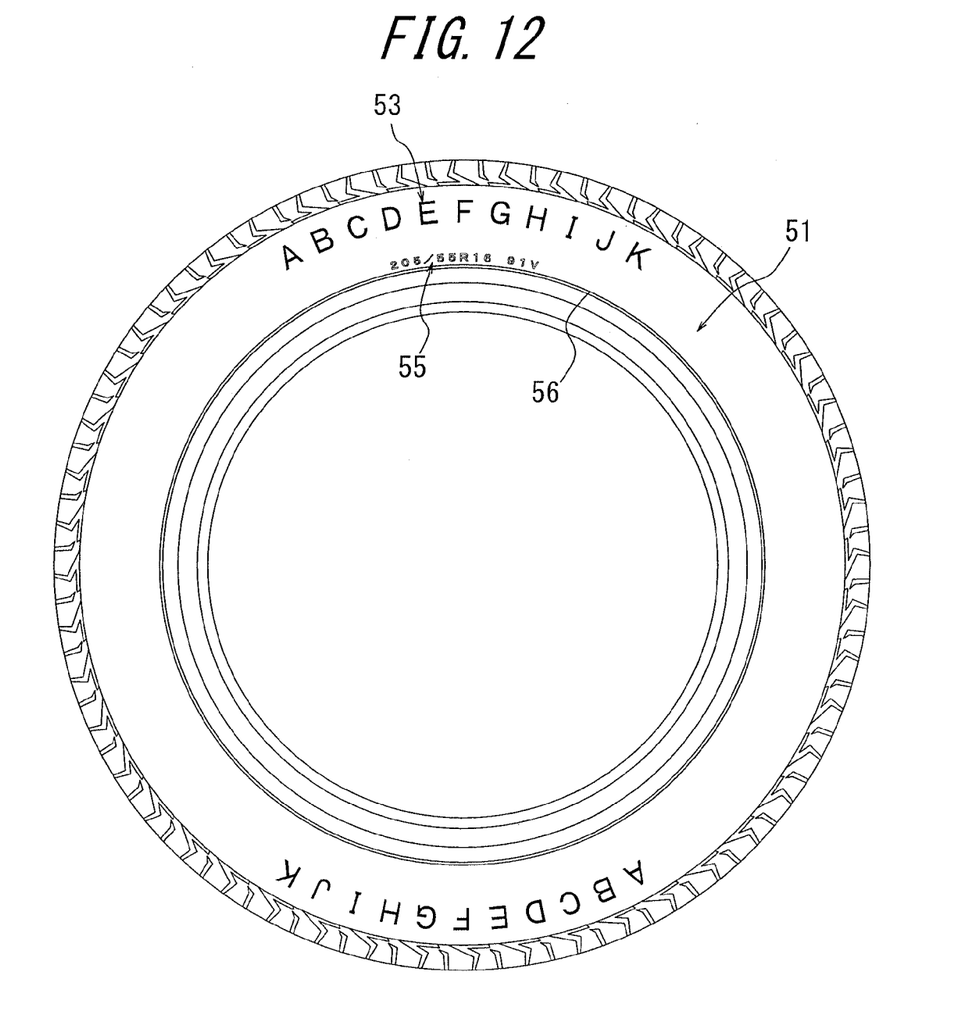
FIG. 12 is a side view illustrating a pneumatic tire according to an eighth embodiment of the present invention.
Figure 13:
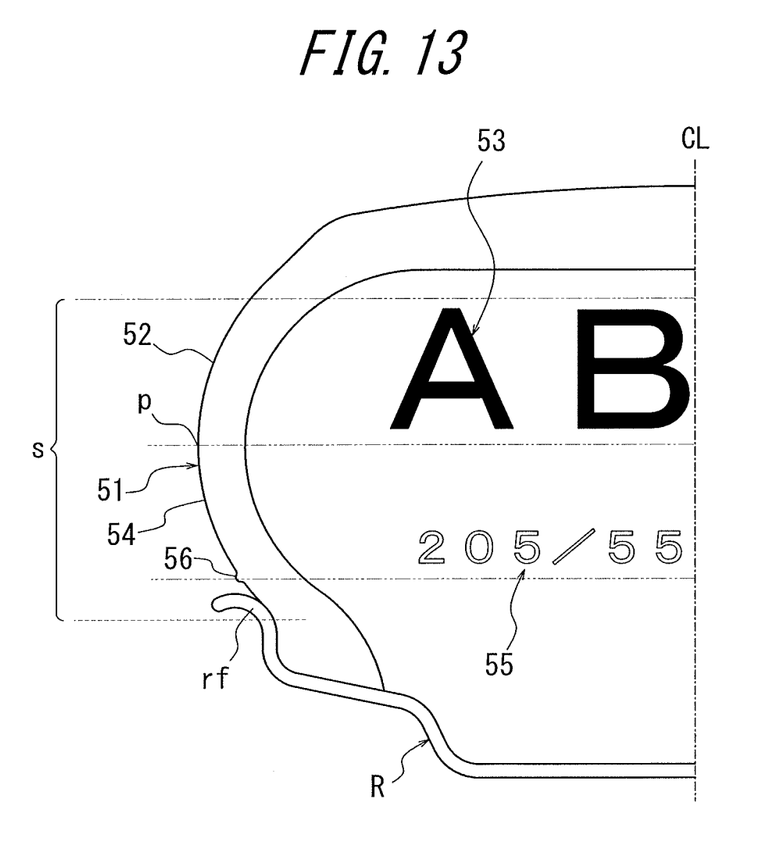
FIG. 13 is a cross-sectional view illustrating a half portion of a pneumatic tire in the width direction under the condition that the pneumatic tire is assembled on a rim and filled with a predetermined air pressure, and is superimposed on the displaying regions with the tire maximum width position being as the boundary.

Further embodiment according to the present invention is explained below with reference to the drawings. As shown in FIGS. 12 and 13, the reference numeral 51 denotes a side portion including a sidewall portion and a bead portion of a pneumatic tire. The pneumatic tire of the embodiment has a plurality of marks disposed on the outer surface of the side portion 51 of the tire for indicating a company name, a tire size and the like.

A mark 53 indicating the company name and the like and having a smooth surface is printed in a sufficiently large dimension on an outer surface 52 radially outward from the tire maximum width position p of the side portion 51 of the tire. Another mark 55 indicating the tire size and the like and having an uneven surface is engraved on another outer surface 54 radially inward from the tire maximum width position p of the side portion 51 of the tire.

As shown in FIG. 13, the reference character R denotes an applicable rim, and the reference character rf denotes a rim flange. In addition, the reference numeral 56 denotes a rim line consisting of a single ridge formed in an annular shape on the outer surface of the side portion of the tire. The rim line 56 is used as a reference for the visual inspection as to whether the assembly condition of the on the applicable rim R is appropriate.

As illustrated in the upper half of FIG. 13, the mark 53 formed with the smooth surface on the tire is preferably formed by embedding colored rubber which has a different color from the base color of the above mentioned outer surface 52 of the side portion 51 of the tire, printing with ink in a desired color, coating with pain in a desired color, or applying a sticker preliminary prepared and separated from the tire. This can sufficiently enhance the identifiability of the mark 53 formed with the smooth surface in conjunction with the dimensions of the letters, graphics, shape, symbols and patterns as the constitutional elements of the mark.

The another mark 55 formed with an uneven surface and provided on a surface radially inward from the tire maximum width position p which has a smaller circumferential velocity is preferably formed with at least one of a projection, a recess and a ridge. For example, as shown in the lower half of FIG. 13, it is preferred for maintaining the appearance of the another mark 55 over a long period of time against soil, sand and the like which may contact and rub the side portion of the tire that the mark 55 is formed with hemming fine stripes of the projections or recesses surrounding the elements of the mark, or a flat surface of the projection or recess in the shape of the elements of the mark per se, or a ridge extending in a straight, curved, or polygonal shape on at least one of the inner side and the outer side of the elements of the mark.

The mark 53 formed with a smooth surface is preferably provided in a region S in FIG. 13 radially outward from the tire maximum width position p which is formed in the vulcanization by the side mold of the split mold so as to be able to prevent the mark from being disappeared due to the contacted with the road surface during driving, and contribute to the durability of the tire by securing a flat surface on the region where the side portion of the tire is largely deformed without having any unevenness which could be a core of a side crack.

In addition, the another mark 55 formed with a an uneven surface is preferably provided on the surface region which is radially inward from the tire maximum width position and is included in the above-mentioned region S and radially outward from the rim line 56 so as to be able to ensure the identifiability of the required display without being hidden behind the rim in a condition that the tire is assembled on the wheel, and prevent the display portion from being rubbed to maintain the identifiability even if the side portion of the tire contacts with the curb.

In addition, the height of the concave or the recess in the display region of the mark on the surface radially outward from of the tire maximum width position p is preferably 2 mm or less to minimize the air resistance of the tire while rolling under load.

It is apparent from the above descriptions, according to the present invention, even if the tire maximum width position p contacts with a curb or the like, the marks 53 and 55 can be effectively protected from wear, abrasion and the like by disposing the marks respectively radially inward and outward sides with the tire maximum width position being as the border. In addition, since the mark 53 formed with the smooth surface is provided on the radially outer portion having a larger circumferential velocity, the area for forming the mark 53 can be secured to be sufficiently large, so that the identifiability of the mark 53 can be enhanced, and an increase in air resistance caused by the arrangement of the mark 53 can be effectively prevented. Meanwhile, since the mark 55 formed with the uneven surface is provided on the radially inner portion having a smaller circumferential velocity, the unintended wear, abrasion and the like can be sufficiently prevented while suppressing an increase of the air resistance.

Therefore, according to the present invention, the identifiability of the mark provided on the tire can be enhanced.

REFERENCE SYMBOLS

1 Side portion of the tire
3, 7, 9, 11, 13, 15, 17 Mark
31 Tire
32 Tread portion
33 Sidewall portion
34 Bead portion
35 Side portion of the tire
36 Mark 37 Line
37a Bright line part
37b Dark line part
37c Boundary part
38 Convex part
38a Top face
38 b One side
38c The other side
51 Side portion of the tire
52, 54 Outer surface
53 Mark formed with a smooth surface
55 Another mark (mark formed with an uneven surface)
56 Rim line
p Tire maximum width position
R Rim
rf Rim flange
S Region

The invention claimed is:

1. A tire having a mark arranged on a surface of a side portion, wherein the mark is formed so as to vary in at least one of hue, brightness and saturation thereof, wherein a line is provided to hem the mark, and the line consists both of a bright line part having a brighter color than the color of the mark and disposed radially and circumferentially at one side of the mark, and a dark line part having a darker color than the color of the mark and disposed radially and circumferentially at the other side of the mark.

2. A tire according to claim 1, wherein the mark includes a gradation portion in which at least one of the hue, brightness and saturation thereof varies stepwise.

3. A tire according to claim 2, wherein the mark includes a letter portion and the gradation portion is arranged adjacent to and along a contour of the letter portion.

4. A tire according to claim 2, wherein a difference of the brightness in the gradation portion is 30% or more.

5. A tire according to claim 2, wherein a difference of the saturation in the gradation portion is 30% or more.

6. A tire according to claim 2, wherein a difference of the hue in the gradation portion is 45 degrees or more.

7. A tire according to claim 2, wherein the brightness in the gradation portion decreases from the inner side toward the outer side.

8. A tire according to claim 2, wherein the saturation in the gradation portion decreases from the inner side toward the outer side.

9. A tire according to claim 1, wherein the mark consists of a letter portion and the letter portion is formed so as to vary in at least one of hue, brightness and saturation thereof stepwise.

10. A tire according to claim 1, wherein the mark consists of a stripe portion extending along a circumferential direction of the tire in a stripe shape and composed of two or more regions having different colors.

11. A tire according to claim 10, wherein the tire comprises the mark consisting of a letter portion in addition to the mark consisting of the stripe portion, and the mark consisting of the letter portion is arranged to overlap the mark consisting of the stripe portion and is colored.

12. A tire according to claim 1, wherein the mark and the line are arranged on a flat part of the side portion of the tire.

13. A tire according to claim 1, wherein the tire is provided with a convex part projecting from the outer surface of the side portion to allow a top face thereof to form the mark; radially and circumferentially one side of the convex part forms the bright line part; and radially and circumferentially the other side of the convex part forms the dark line part.

14. A tire according to claim 1, wherein the mark formed with a smooth surface is provided on a surface radially outward from a tire maximum width position, and another mark formed with an uneven surface is provided on a surface radially inward from the tire maximum width position.

* * * * *